United States Patent [19]

Scharf et al.

[11] Patent Number: 4,627,983
[45] Date of Patent: Dec. 9, 1986

[54] FUNCTIONAL PROTEIN HYDROLYZATES, A PROCESS FOR THEIR PREPARATION, USE OF THESE PROTEIN HYDROLYZATES AS A FOOD ADDITIVE, AND FOODS CONTAINING THESE PROTEIN HYDROLYZATED

[75] Inventors: Udo Scharf, Frankfurt am Main; Merten Schlingmann, Königstein; Gert-Wolfhard von Rymon Lipinski, Frankfurt am Main, all of Fed. Rep. of Germany

[73] Assignee: Hoechst Aktiengesellschaft, Frankfurt am Main, Fed. Rep. of Germany

[21] Appl. No.: 775,101

[22] Filed: Sep. 11, 1985

Related U.S. Application Data

[63] Continuation of Ser. No. 438,753, Nov. 3, 1982, abandoned.

[30] Foreign Application Priority Data

Nov. 5, 1981 [DE] Fed. Rep. of Germany ....... 3143947

[51] Int. Cl.$^4$ .......... A23J 3/00; A23L 1/305; C12P 21/06
[52] U.S. Cl. .......... 426/7; 426/60; 426/654; 426/656; 435/69; 435/858
[58] Field of Search .......... 426/7, 60, 656, 454; 435/68, 69, 270, 858

[56] References Cited

U.S. PATENT DOCUMENTS

| | | | |
|---|---|---|---|
| 3,778,513 | 12/1973 | Shiga et al. | 426/7 |
| 3,903,310 | 9/1975 | Buide et al. | 426/656 X |
| 4,107,334 | 8/1978 | Jolly | 426/7 |
| 4,129,664 | 12/1978 | Kruseman et al. | 426/7 |
| 4,206,243 | 6/1980 | Schlingmann et al. | 426/656 X |
| 4,293,571 | 10/1981 | Olofsson et al. | 426/656 X |
| 4,293,574 | 10/1981 | Mikami et al. | 426/656 X |
| 4,427,658 | 1/1984 | Maubois et al. | 435/68 X |
| 4,431,629 | 2/1984 | Olsen | 435/69 X |
| 4,443,540 | 4/1984 | Chervan et al. | 435/69 |

OTHER PUBLICATIONS

Chemical Abstracts, 88, 188523s, "Milk-Substitute Fodders by Enzymatic Hydrolysis of Protein-Containing Materials."

*Primary Examiner*—Robert Yoncoskie
*Attorney, Agent, or Firm*—Curtis, Morris & Safford

[57] ABSTRACT

Functional hydrolyzates are prepared from microbial protein isolates, with
a protein content of more than 90% by weight,
a nucleic acid content of less than 2% by weight,
a lipid content of less than 1% by weight,
a suspendability of 80–100%,
a foaming capacity characterized by a foaming index of 4–7,
a foam stability characterized by a half-life of 10–300 minutes,
an emulsifying capacity characterized by a value of 300–500 ml of oil/g of protein, and
a molecular weight of between 125,000 and 100 Daltons.

The functional hydrolyzates are obtained from microbial proteins by enzymatic hydrolysis, after extraction of the nucleic acids and lipids. The hydrolyzates are suitable as food additives.

19 Claims, No Drawings

FUNCTIONAL PROTEIN HYDROLYZATES, A PROCESS FOR THEIR PREPARATION, USE OF THESE PROTEIN HYDROLYZATES AS A FOOD ADDITIVE, AND FOODS CONTAINING THESE PROTEIN HYDROLYZATED

This application is a continuation of application Ser. No. 438,753, filed Nov. 3, 1982, now abandoned.

The invention relates to functional protein hydrolyzates obtained from microbial proteins, a process for their preparation, and also foods which are prepared with the protein hydrolyzates and which are thereby improved in their properties relating to food technology.

The preparation of microbial proteins has already been described in many publications. A particularly advantageous process is known from German Pat. No. 2,633,451 (U.S. Pat. No. 4,166,004), in which a protein-rich bacterial cell mass is obtained by culture of bacteria of the *Methylomonas clara* ATCC 31,226 strain in a nutrient medium containing methanol. The bioprotein obtained in this way makes it possible to prepare a protein isolate suitable for food purposes, in which the lipid and nucleic acid content is considerably reduced, in accordance with the process of German Auslegeschrift No. 2,633,666 (U.S. Pat. No. 4,206,243), by extraction with a special solvent mixture. Without reduction of the especially high content of nucleic acids in microbially prepared proteins, bioproteins of this type cannot be used for food purposes, in particular for human nutrition, because the nucleic acids are not completely degraded in the human organism and degradation products are excreted only to an insufficient extent. Nucleic acid degradation products can therefore become concentrated in the organism and pathological symptoms, such as gout, can be caused.

Although the protein isolates obtained by the process of German Auslegeschrift No. 2,633,666 are high-value proteins, their use in foods is limited because their properties relating to food technology still do not satisfy all requirements. In addition to good properties relating to nutrition physiology, new proteins are required to have, depending on the intended field of use, a good solubility or suspendability, a high foaming capacity and foam stability, and also an oil-binding capacity and emulsifying capacity satisfying the particular requirements. Which of these functional properties is required above all depends on the particular intended application of the protein. For example, if it is to be used for improving the properties of a mayonnaise, then it will be required above all to be capable of stabilizing emulsions. On the other hand, if it is to be used in a frothy baked confection, such as a meringue, then a protein suitable for this purpose will be required to have above all a high foaming capacity and foam stability. Again, if it is intended to be used as a coffee whitener, then, in addition to the emulsifying capacity, it is particularly important for the protein to have a good solubility.

In order to meet these multiple requirements, numerous suggestions for the modification of proteins have already been made. Thus, water-soluble proteins suitable for foam formation, which are obtained by proteolytic degradation of microbially prepared proteins, are already known from Japanese Laid-Open Patent Application Sho No. 53-6491. The proteins obtained in this way are also said to be usable for foam formation in fire-extinguishing substances and in cement.

A process for the preparation of a protein hydrolyzate freed of proteins and macropeptides, by the application of ultrafiltration, is known from British Patent Application No. 2,043,651. This process gives a mixture of peptides of low molecular weight, which can be used as a dietetic food. The preparation of functional protein hydrolyzates is not described in the patent application.

German Offenlegungsschrift No. 2,745,954 describes a process for the preparation of functional protein, in which unpurified natural protein of varying origin is heated in an aqueous medium until the protein precipitates, and the precipitated protein, which has been separated off, is then treated with proteolytic enzymes. The protein hydrolyzate obtained is said not to have a bitter taste and to be distinguished above all by a good water solubility and heat stability over a wide pH range. Insofar as microbial proteins are used, only yeasts, and not bacteria, are mentioned as starting materials. In fact, generally functional properties are attributed to the protein products obtained, but these properties are not characterized more precisely and there is also no explanation as to which possible applications exist on the basis of special functional properties.

The object was therefore to prepare protein hydrolyzates which are high-value in terms of nutrition physiology and problem-free in terms of taste, and which, on the basis of their specific properties relating to food technology, are capable of taking over very special functions during the processing to high-value foods. This object was to be achieved on the basis of microbial proteins such as, for example, those obtainable by the process of German Patent No. 2,633,451 or other processes in which microorganisms are used for protein formation.

This object could be achieved according to the invention, in its broadest form, by a universally applicable, functional protein hydrolyzate which is prepared from microbial protein isolates and has a protein content of more than 90% by weight,
a nucleic acid content of less than 2% by weight,
a lipid content of less than 1% by weight,
a suspendability of 80 to 100%,
a foaming capacity characterized by a foaming index of 4 to 7,
a foam stability characterized by a half-life of 10 to 300 minutes,
an emulsifying capacity characterized by a value of 300 to 500 ml of oil/g of protein, and
a molecular weight of between 125,000 and 100 Daltons.

The abovementioned combination of important properties relating to food technology, amongst which the good foaming capacity and foam stability, together with a high emulsifying capacity, are to be singled out in particular, immediately gives the expert a first indication of possible fields of use of such protein hydrolyzates. Whenever foods are to have a loose structure but contain at the same time water-soluble and fat-soluble constituents, as is the case, for example, with desserts, bread, cakes and pastries, pasta and imitation cheeses, the addition of the abovementioned protein hydrolyzates not only achieves an improvement in terms of nutrition physiology, but also facilitates the technological processing of the foods.

However, there are many problems relating to food technology which can no longer be solved with a universal protein hydrolyzate of this type. Thus, for example, there are fields of use in which substantially more stringent requirements are still made of the foaming capacity and foam stability, although there is less demand for a good emulsifying capacity. Examples which may be considered in this context are frothy sugar products, such as meringues, frothy ice-cream, desserts and the like. In contrast, in other fields of use, the requirements for a high emulsifying capacity are of primary importance. Examples which may be mentioned in this context are certain sausage products, cheese products, cakes and pastries, and creams, but also mayonnaise and salad dressings or other fatty preparations.

These objects could now be achieved by means of certain fractions of the abovementioned protein hydrolyzate.

The invention therefore also relates to a fraction of the functional protein hydrolyzate of the type described above, which is distinguished therefrom in that it has a solubility of 100%, a foaming capacity characterized by a foaming index of 9–16, a foam stability characterized by a half-life of 20 to 120 minutes, an emulsifying capacity characterized by a value of 30 to 60 ml of oil/g of protein, and a molecular weight of between 5,000 and 100 Daltons, all other properties being the same.

In this combination of properties, the striking feature, in addition to the good solubility, is above all the outstanding foaming capacity, whilst the emulsifying capacity is not very pronounced.

Another set of properties, however, is shown by another fraction of the functional protein hydrolyzate of the type described above, which is distinguished in that it has a suspendability of 70 to 90%, a foaming capacity characterized by a foaming index of 1 to 3, a foam stability characterized by a half-life of 2 to 1,000 minutes, an emulsifying capacity characterized by a value of 400 to 800 ml of oil/g of protein, and a molecular weight of between 125,000 and 5,000 Daltons, all other properties being the same.

This fraction is thus distinguished by a particularly high emulsifying capacity.

The first of the abovementioned universally applicable, functional protein hydrolyzates is obtained by initially subjecting a microbial protein, preferably protein obtained from bacteria, especially from Methylomonas clara ATCC 31,226, to an extraction treatment in order to reduce its nucleic acid and lipid content, and then hydrolytically degrading it by the action of one or more endoproteases. The reduction in the nucleic acid and lipid content of the protein mass, which is essential for the use of the functional protein isolates according to the invention as foods, can in fact be carried out by a number of different processes, which are characterized as a rule by alkaline disintegration of the cell material. Of all these processes, however, the procedure known from German Auslegeschrift No. 2,633,666 is to be preferred; in this procedure, the cell material is treated initially with a substantially to completely anhydrous extraction mixture consisting of an alcohol, such as methanol, and ammonia, and then with water. This method is considerably milder than all other processes, prevents degradation of or damage to the protein, and leads, after only a very short period of action, to virtually complete removal of the lipids and nucleic acids.

Advantageously, drinking water filtered under sterile conditions is first added to the protein mass thus obtained, in order to hydrolyze it, until a solids content of between 10 and 20% by weight is reached. The pH value of the suspension is adjusted, advantageously with dilute NaOH solution, to the optimum pH value for the action of the protease to be used, this pH value generally being between 7.0 and 8.0. The protease is then added to the suspension at a temperature of between 30 and 50° C., and the weight ratio enzyme/substrate is to be between 1:500 and 1:1,000.

The enzymes to be used are endoproteases, the optimum pH value of which is preferably in the region of neutrality. To obtain a protein hydrolyzate which is good in terms of taste and free of any bitter taste, the proteases alkalase 0.6 L, corolase S 50, trypsin PTN 3.0 S and α-chymotrypsin, and also mixtures of these enzymes, have proved particularly suitable.

During the proteolysis, which lasts about 15 to 240 minutes, the temperature of the batch is kept constant. During this time, the pH value of the suspension slowly shifts into the acid region. It is therefore necessary to ensure, by constant subsequent introduction of alkali, in particular of dilute sodium hydroxide solution, that the pH value which is optimum for the action of the enzyme is maintained.

After the incubation has ended, the batch is heated, preferably for about 5 minutes at 80° C., in order to deactivate the enzyme. The hydrolyzate obtained in this way can be fed directly to the drying process or split up further by fractionation in order to obtain protein hydrolyzates with highly specific properties. The simplest possibility for the further processing of the protein hydrolyzate described above consists in separating off especially high-molecular, non-suspendable small particles by means of a separator. The product then obtained thus has all the other properties of the original protein hydrolyzate, but is distinguished by a 100% suspendability. In general, however, the fine phase obtained by means of the separator must be split up further by fractionation.

Ultrafiltration is suitable, in particular, for separation of the fine phase obtained from the separator, a plate filter or hollow fibers with an exclusion limit of 80,000–100,000 Daltons being used. This makes it possible to achieve separation into a low-molecular fraction soluble to give a clear solution, i.e. the permeate, and into a high-molecular fraction suspendable to give a turbid suspension, i.e. the retentate. The permeate from the ultrafiltration is a peptide mixture having a molecular weight distribution of between 100 and 5000 Daltons and soluble in water to give a clear solution. It is readily digestible and, for this reason, is also very suitable both for the protein enrichment of liquid foods and also for the enteral feeding of patients who have just undergone operations. However, particularly notable in respect of the functional properties of this fraction is the fact that the foaming and foam-stabilizing properties already present in the non-fractionated protein hydrolyzate are concentrated in this low-molecular fraction. On the other hand, the reaminder (retentate) from the ultrafiltration is a turbid suspension which, after drying, can readily be suspended in water. This fraction shows very good emulsion-stabilizing properties and can therefore be used as an emulsifier in foods rich in fat. Moreover, this fraction shows pronounced viscosity-increasing properties, which enable it to be applied as thickener in the manufacture and preparation of foods.

A particularly simple fractionation of the hydrolyzate obtained by proteolysis can be achieved with the aid of a membrane reactor. In fact, in this case, it is no longer necessary to isolate the hydrolyzate before the fractionation, the low-molecular fraction already being continuously separated off during the hydrolysis, whilst the higher-molecular portions remain in the reactor as the retentate.

The examples which follow illustrate the preparation, testing and application of the protein hydrolysates according to the invention. Unless otherwise indicated, percentages are by weight.

A product according to Example 2 of German Pat. No. 2,633,451 was used as the protein isolate.

EXAMPLE 1

100 g of microbial protein isolate, the nucleic acid content and lipid content of which have been reduced by the process of German Auslegeschrift No. 2,633,666, are suspended in 900 ml of water and the pH value is adjusted to 8.0 by the addition of 4N NaOH solution. The suspension is pre-incubated to 45° C. and treated with 0.5 ml of alkalase 0.6 L (Novo), and the mixture is incubated for 15 minutes at 45° C., with stirring. To deactivate the enzyme, the batch is heated at 90° C. for 5 minutes, the pH value is adjusted to 7.0 and the suspension is dried.

EXAMPLE 2

100 g of microbial protein isolate, the nucleic acid content and fat content of which have been reduced by the process of German Auslegeschrift No. 2,633,666, are suspended in 900 ml of water and the pH value is adjusted to 8.0 by the addition of 4N NaOH solution. The suspension is pre-incubated to 45° C. and treated with 100 mg of trypsin PTN 3.0 S (Novo), and the mixture is incubated for 4 hours at 45° C. under constant pH conditions, with stirring. To deactivate the enzyme, the batch is heated at 80° C. for 5 minutes, the pH value is adjusted to 7.0 and the suspension is dried.

EXAMPLE 3

The procedure of Example 2 is followed, except that the proteolysis is carried out by the addition of 150 mg of trypsin/chymotrypsin 2/1S (Novo), but the subsequent procedure is then as in Example 2.

EXAMPLE 4

The hydrolyzate obtained in Example 2 is subjected, before drying, to ultrafiltration on a hollow fiber ultrafiltration system (Amicon DC-2) with cartridges having an exclusion limit of 100,000 Daltons (H1P 100). The retentate and permeate are separately collected and dried.

EXAMPLE 5

1 kg of microbial protein isolate, the nucleic acid content and fat content of which have been reduced according to the process of German Auslegeschrift No. 2,633,666, are suspended in 9 liters of water and the pH value is adjusted to 8.0 by the addition of 4N NaOH solution. The suspension is pre-incubated to 45° C. in an enzyme reactor and treated with 1 g of trypsin PTN 3.0 S (Novo), and the mixture is incubated under constant temperature and pH conditions, with stirring. After an incubation time of 30 minutes, an external circulation of the incubation batch via a hollow fiber ultrafiltration system (Amicon DC-10) with cartridges having an exclusion limit of 5,000 Daltons (H 10 P5) is started, the retentate is recycled into the enzyme reactor and the volume of liquid is corrected with water. The permeate is collected and dried.

After the incubation time has ended, the enzyme is deactivated in the enzyme reactor by heat treatment (5 minutes/80° C.) and the retentate is dried.

EXAMPLE 6

The microbial protein hydrolyzates obtained according to Examples 1-5 were tested for their solubility properties:

100 ml of a 10% strength suspension are adjusted to the desired pH value (HCl/NaOH), homogenized for a short time and centrifuged at 1,500 g in a previously weighed glass centrifuge tube. The supernatant is decanted off and the sediment is dried to constant weight at 100° C. The glass tube containing the residue is weighed and the solubility is calculated.

| Products of | Fraction | Solubility (%) at pH 3.0 | 5.0 | 7.0 |
|---|---|---|---|---|
| Example 1 | — | 81 | 85 | 97 |
| Example 2 | — | 77 | 90 | 91 |
| Example 3 | — | 85 | 94 | 98 |
| Example 4 | Permeate | 100 | 100 | 100 |
|  | Retentate | 71 | 68 | 90 |
| Example 5 | Permeate | 100 | 100 | 100 |
|  | Retentate | 73 | 70 | 91 |

EXAMPLE 7

The protein hydrolyzates obtained according to Examples 1-5 were tested for their foaming properties:

25 ml of a 5% strength suspension are adjusted to the desired pH value (HCl/NaOH) and foamed for 1 minute in a 500 ml measuring cylinder with a laboratory homogenizer ("Ultraturrax" from Jahnke & Kunkel, type T 45). The following were determined:
Foaming index:

$$\frac{\text{Volume of foam (ml)}}{\text{Starting volume (ml)}}$$

(based on the method of: M. J. Y. Lin and E. S. Humbert: J. Food Sci. 39, 368 (1974)).

Foam half-life: Length of time until 50% by volume of the starting solution has drained out of the foam.
(based on the method of: L. D. Satterlee, N. Y. Zachariah and E. Levin: J. Food Sci. 38, 268 (1973)).

| Products of | Fraction | Foaming index at pH 3 | 4 | 5 | 6 | 7 | 8 | Half-life (minutes) at pH 3 | 4 | 5 | 6 | 7 | 8 |
|---|---|---|---|---|---|---|---|---|---|---|---|---|---|
| Example 1 | — | 4.0 | 4.2 | 4.6 | 4.3 | 4.2 | 3.9 | 48 | 115 | 17 | 15 | 14 | 10 |
| Example 2 | — | 4.5 | 5.5 | 5.8 | 6.0 | 6.2 | 4.5 | 300 | 210 | 150 | 40 | 20 | 15 |
| Example 3 | — | 5.0 | 5.6 | 7.0 | 6.5 | 6.0 | 5.4 | 300 | 95 | 43 | 31 | 24 | 18 |
| Example 4 | Permeate | 12.8 | 15.2 | 15.6 | 15.6 | 16.0 | 14.8 | 120 | 114 | 97 | 35 | 42 | 20 |
|  | Retentate | 2.1 | 1.9 | 1.5 | 2.4 | 2.4 | 2.4 | 1,000 | 1,000 | 1,000 | 1,000 | 5 | 2 |
| Example 5 | Permeate | 11.9 | 14.8 | 15.2 | 15.8 | 15.3 | 14.5 | 123 | 118 | 105 | 37 | 40 | 23 |

| | | Foaming index at pH | | | | | | Half-life (minutes) at pH | | | | |
|---|---|---|---|---|---|---|---|---|---|---|---|---|
| Products of | Fraction | 3 | 4 | 5 | 6 | 7 | 8 | 3 | 4 | 5 | 6 | 7 | 8 |
| | Retentate | 2.4 | 2.1 | 1.9 | 3.0 | 2.9 | 2.4 | 1,000 | 1,000 | 1,000 | 915 | 7 | 4 |

EXAMPLE 8

The protein hydrolyzates obtained according to Examples 1–5 were tested for their emulsifying capacity:

20 ml of product solution (10, 5, 1 or 0.5% strength) were adjusted to the desired pH value (HCl/NaOH) and emulsified with 60–80 ml of sunflower oil with the aid of a laboratory homogenizer ("Ultraturrax", Janke & Kunkel, type 18–10). The emulsion formed was evaluated on the basis of the method of H. Aoki and N. Nagamori: Nippon Shokulin Kogyo Gakkaishi 27 (11), 550 (1980), by determination of the viscosity (Haake VT 181 Viscotester).

The emulsifying capacity is defined as ml of oil/g of protein (J. E. Kinsella: Critical Reviews in Food Science and Nutrition 4, 219 (1976)):

| Product of | Fraction | Emulsifying capacity pH 5 | (ml of oil g of protein) pH 7 |
|---|---|---|---|
| Example 1 | — | 300 | 500 |
| Example 2 | — | 500 | 500 |
| Example 3 | — | 300 | 300 |
| Example 4 | Permeate | 60 | 60 |
| | Retentate | 800 | 600 |
| Example 5 | Permeate | 60 | 30 |
| | Retentate | 600 | 400 |

EXAMPLE 9

The molecular weight determinations on the products of Examples 1–3 and the retentates of Examples 4 and 5 are carried out by means of gel chromatography on ®SEPHADEX G 100 in an ammonium acetate buffer of pH 7.4, containing 48% of urea and 0.1% of sodium laurylsulfate.

| Product of | Fraction | Molecular weight |
|---|---|---|
| Example 1 | — | 100–125,000 Daltons |
| Example 2 | — | 100–125,000 Daltons |
| Example 3 | — | 100–125,000 Daltons |
| Example 4 | Retentate | 5,000–125,000 Daltons |
| Example 5 | Retentate | 5,000–125,000 Daltons |

EXAMPLE 10

The molecular weight determination on the permeates of Examples 4 and 5 was carried out by means of gel chromatography on SEPHADEX G50 and G25 in 0.01M Na acetate buffer of pH 7.0. The permeates are characterized by a molecular weight of between 100 and 5,000 Daltons.

EXAMPLE 11

The permeate from membrane filtration obtained from Examples 4 and 5 is used to prepare a 10–15% strength (w/w) solution in water.

50 ml of this solution are beaten with a domestic mixer to a stiff foam and 100 g of icing sugar and 5 g of vanilla sugar, in portions, are folded in. The foam is forced through a cream syringe and baked for 75 minutes at 120° C.

The meringues thus obtained are distinguished by a uniform, finely porous structure and a characteristic taste.

EXAMPLE 12

The retentate from membrane filtration obtained from Examples 4 and 5 is used to prepare a 1–2% strength (w/w) solution in water.

15 ml of this solution are stirred with half a teaspoon of salt, 1 drop of vinegar and half a teaspoon of mustard, and a total of 125 ml of vegetable oil are then worked in, in portions, with vigorous stirring using a domestic mixer.

The salad mayonnaise thus obtained is a completely homogeneous emulsion with a high stability and without disadvantageous sensory properties.

We claim:

1. A functional hydrolyzate obtained from enzymatically hydrolyzed microbial protein isolates, with properties comprising
   a protein content of more than 90% by weight,
   a nucleic acid content of less than 2% by weight,
   a lipid content of less than 1% by weight,
   a suspendability of 80–100%,
   a foaming capacity characterized by a foaming index of 4–7,
   a foam stability characterized by a half-life of 10–300 minutes,
   an emulsifying capacity characterized by a value of 300–500 ml of oil/g of protein, and
   a molecular weight of between 125,000 and 100 Daltons.

2. A process for improving the technological properties of a food which comprises incorporating into said food a functional hydrolyzate as claimed in claim 1.

3. A food which contains the functional hydrolyzate as claimed in claim 1.

4. The functional hydrolyzate as claimed in claim 1, in which microbial protein is a bacterial protein.

5. The functional hydrolyzate as claimed in claim 4, wherein the microbial protein is a protein obtained from the bacteria, *Methylomonas clara* ATCC 31226.

6. A process for the preparation of the functional hydrolyzate as claimed in claim 1, including the following steps in the order given:
   reducing the nucleic acid and lipid content of a microbial protein by subjecting the protein to a two-step extraction treatment using methanol/ammonia and water;
   forming a suspension of the microbial protein in water, said suspension having a solids content of between 10 and 20% by weight and a pH of between 7.0 abd 8.0;
   enzymatically hydrolyzing the microbial protein by contacting the suspension with an endoprotease in a weight ratio of endoprotease to suspension of between 1:500 and 1:1000 at a pH between 7.0 and 8.0; and
   deactivating the endoprotease.

7. The process as claimed in claim 6, wherein the microbial protein is a bacterial protein.

8. The process as claimed in claim 7, wherein the microbial protein is a protein obtained from the bacteria, *Methylomonas clara* ATCC 31226.

9. The process as claimed in claim 6 in which the endoprotease is selected from the group consisting of alkalase, corolase, trypsin and α-chymotrypsin.

10. A functional hydrolyzate obtained as a fraction from an enzymatically hydrolyzed microbial protein isolate, with properties comprising
    a protein content of more than 90% by weight;
    a nucleic acid content of less than 2% by weight,
    a lipid content of less than 1% by weight;
    a solubility of 100%;
    a foaming capacity characterized by a foaming index of 9-16;
    a foam stability characterized by a half-life of 20-120 minutes;
    an emulsifying capacity characterized by a value of 30-60 ml of oil/g of protein; and
    a molecular weight of between 5,000 and 100 Daltons.

11. A process for improving the technological properties of a food which comprises incorporating into said food the functional hydrolyzate as claimed in claim 10.

12. A food which contains the functional hydrolyzate as claimed in claim 10.

13. A process for the preparation of the functional hydrolyzate as claimed in claim 10, including the following steps in the order given:
    reducing the nucleic acid and lipid content of a microbial protein by subjecting the protein to a two-step extraction treatment using methanol/ammonia and water;
    forming a suspension of the microbial protein in water, such suspension having a solids content of between 10 and 20% by weight and a pH of between 7.0 and 8.0;
    enzymatically hydrolyzing the microbial protein by contacting the suspension with an endoprotease in a weight ratio of endoprotease to suspension of between 1:500 and 1000 at a pH between 7.0 and 8:0;
    deactivating the endoprotease; and
    subjecting the formed protein hydrolyzate to ultra-filtration to obtain a permeate and a retentate, the permeate being the functional hydrolyzate.

14. A process as claimed in claim 13, wherein the enzymatic hydrolysis is performed in a membrane reactor.

15. A functional hydrolyzate obtained as a fraction from an enzymatically hydrolyzed microbial protein isolate, with properties comprising
    a protein content of more than 90% by weight;
    a nucleic acid content of less than 2% by weight;
    a lipid content of less than 1% by weight;
    a suspendability of 70-90%;
    a foaming capacity characterized by a foaming index of 1-3;
    a foam stability characterized by a half-life of 2-1,000 minutes;
    an emulsifying capacity characterized by a value of 400-800 ml of oil/g protein; and
    a molecular weight of between 125,000 and 5,000 Daltons.

16. A process for improving the technological properties of a food which comprises incorporating into said food the functional hydrolyzate as claimed in claim 15.

17. A food which contains the functional hydrolyzate as claimed in claim 15.

18. A process for the preparation of the functional hydrolyzate as claimed in claim 15, including the following steps in the order given:
    reducing the nucleic acid and lipid content of a microbial protein by subjecting the protein to a two-step extraction treatment using methanol/ammonia and water;
    forming a suspension of the microbial protein in water, said suspension having a solids content of between 10 and 20% by weight and a pH of between 7.0 and 8.0;
    enzymatically hydrolyzing the microbial protein by contacting the suspension with an endoprotease in a weight ratio of endoprotease to suspension of between 1:500 and 1:1000 at a pH between 7.0 and 8.0;
    deactivating the endoprotease; and
    subjecting the formed protein hydrolyzate to ultra-filtration to obtain a permeate and a retentate, the retentate being a suspension containing the functional hydrolyzate.

19. A process as claimed in claim 18, wherein the enzymatic hydrolysis is performed in a membrane reactor.

* * * * *